(12) United States Patent
Miyahara (10) Patent No.: US 11,025,810 B2
(45) Date of Patent: Jun. 1, 2021

(54) CONTROL MODULE CAPABLE OF SHORTENING A TIME REQUIRED TO START UP AN ELECTRONIC DEVICE, ELECTRONIC DEVICE, AND CONTROL METHODS

(71) Applicant: CANON KABUSHIKI KAISHA, Tokyo (JP)

(72) Inventor: Kazuya Miyahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/037,158

(22) Filed: Jul. 17, 2018

(65) Prior Publication Data
US 2019/0028628 A1    Jan. 24, 2019

(30) Foreign Application Priority Data
Jul. 20, 2017    (JP) .............................. JP2017-140671

(51) Int. Cl.
    H04N 5/232        (2006.01)
    H04N 5/225        (2006.01)
    H04L 29/12        (2006.01)

(52) U.S. Cl.
    CPC ..... *H04N 5/23206* (2013.01); *H04L 61/2038* (2013.01); *H04L 61/2092* (2013.01); *H04N 5/2252* (2013.01); *H04N 5/2257* (2013.01); *H04N 5/23218* (2018.08)

(58) Field of Classification Search
    CPC ............. H04N 5/23206; H04N 5/2257; H04N 5/2252; H04N 5/23218; H04L 61/2038; H04L 61/2092
    See application file for complete search history.

(56) References Cited

U.S. PATENT DOCUMENTS

| 8,525,924 | B2 | 9/2013 | Jannard |
| 8,525,925 | B2 | 9/2013 | Jannard |
| 2004/0133721 | A1* | 7/2004 | Ellerbrock ............ G06F 13/387 710/104 |
| 2005/0117025 | A1* | 6/2005 | Ambiru ............ G08B 13/19656 348/211.99 |
| 2010/0165138 | A1 | 7/2010 | Jannard |
| 2010/0165188 | A1 | 7/2010 | Jannard |

(Continued)

FOREIGN PATENT DOCUMENTS

| JP | 2007-311881 A | 11/2007 |
| JP | 2012-514391 A | 6/2012 |
| WO | 2010/078173 A1 | 7/2010 |

*Primary Examiner* — Gevell V Selby
(74) *Attorney, Agent, or Firm* — Cowan, Liebowitz & Latman, P.C.

(57) ABSTRACT

A control module of an electronic device includes a control unit that recognizes modules and allocates unique addresses to the modules, and a storage unit that stores predetermined information including the unique addresses allocated to the modules. If communication is possible with a predetermined module, the control unit performs communication with the modules based on the predetermined information without updating the predetermined information. If communication is not possible with the predetermined module, the control unit updates the predetermined information to perform communication with the modules based on the updated predetermined information.

17 Claims, 8 Drawing Sheets

(56) References Cited

U.S. PATENT DOCUMENTS

| | | | |
|---|---|---|---|
| 2013/0128311 A1* | 5/2013 | Kim | G06F 3/1296 358/1.15 |
| 2015/0146071 A1* | 5/2015 | Yi | H04N 21/41407 348/333.02 |
| 2016/0109862 A1* | 4/2016 | Ohnishi | G05B 9/03 700/20 |
| 2017/0087059 A1* | 3/2017 | Rodriguez | G16H 20/13 |

* cited by examiner

CONTROL MODULE CAPABLE OF SHORTENING A TIME REQUIRED TO START UP AN ELECTRONIC DEVICE, ELECTRONIC DEVICE, AND CONTROL METHODS

BACKGROUND

Field of the Invention

Aspects of the disclosure generally relate to a control module, an electronic device, and control methods thereof.

Description of the Related Art

Japanese Patent Laid-Open No. 2012-514391 describes a digital camera system formed from modules (to be referred to as a modular digital camera system hereinafter). Moreover, Japanese Patent Laid-Open No. 2007-311881 describes an address setting method in a wireless communication system that includes communication apparatuses complying with a wireless USB standard.

However, the modular digital camera system is formed from the modules, and it is therefore assumed that a long time is required to start up the digital camera system depending on the number of modules that form the digital camera system. This problem is not limited to the modular digital camera system and can also arise in an electronic device formed from modules.

SUMMARY OF THE INVENTION

According to an aspect of the embodiments, a module, a device, a method, or the like capable of shortening a time required to start up an electronic device formed from modules are provided.

According to an aspect of the embodiments, there is provided a control module comprising: a control unit that recognizes modules and allocates unique addresses to the modules; and a storage unit that stores predetermined information which includes the unique addresses allocated to the modules, wherein the control unit (a) performs communication with the modules based on the predetermined information without updating the predetermined information if communication is possible with a predetermined module, and (b) updates the predetermined information to perform communication with the modules based on the updated predetermined information if communication is not possible with the predetermined module.

According to an aspect of the embodiments, there is provided an electronic device comprising: modules; and a control module including a control unit that recognizes the modules and allocates unique addresses to the modules, and a storage unit that stores predetermined information which includes the unique addresses allocated to the modules, wherein the control unit (a) performs communication with the modules based on the predetermined information without updating the predetermined information if communication is possible with a predetermined module, and (b) updates the predetermined information to perform communication with the modules based on the updated predetermined information if communication is not possible with the predetermined module.

According to an aspect of the embodiments, there is provided a method comprising: performing communication with the modules based on predetermined information, which includes unique addresses allocated to modules, without updating the predetermined information if communication is possible with a predetermined module; and updating the predetermined information to perform communication with the modules based on the updated predetermined information if communication is not possible with the predetermined module.

According to an aspect of the embodiments, there is provided a non-transitory storage medium that stores a program causing a computer to execute a method, the method comprising: performing communication with the modules based on predetermined information, which includes unique addresses allocated to modules, without updating the predetermined information if communication is possible with the predetermined module; and updating the predetermined information to perform communication with the modules based on the updated predetermined information if communication is not possible with the predetermined module.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1A:
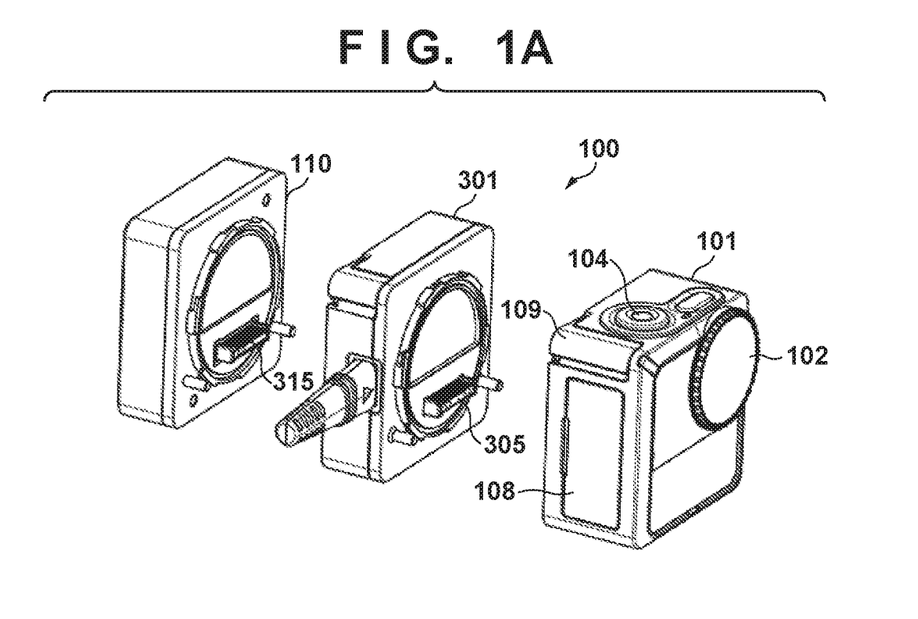
FIG. 1A is a perspective view showing an electronic device 100 formed from modules when viewed from an obliquely front side.
Figure 1B:
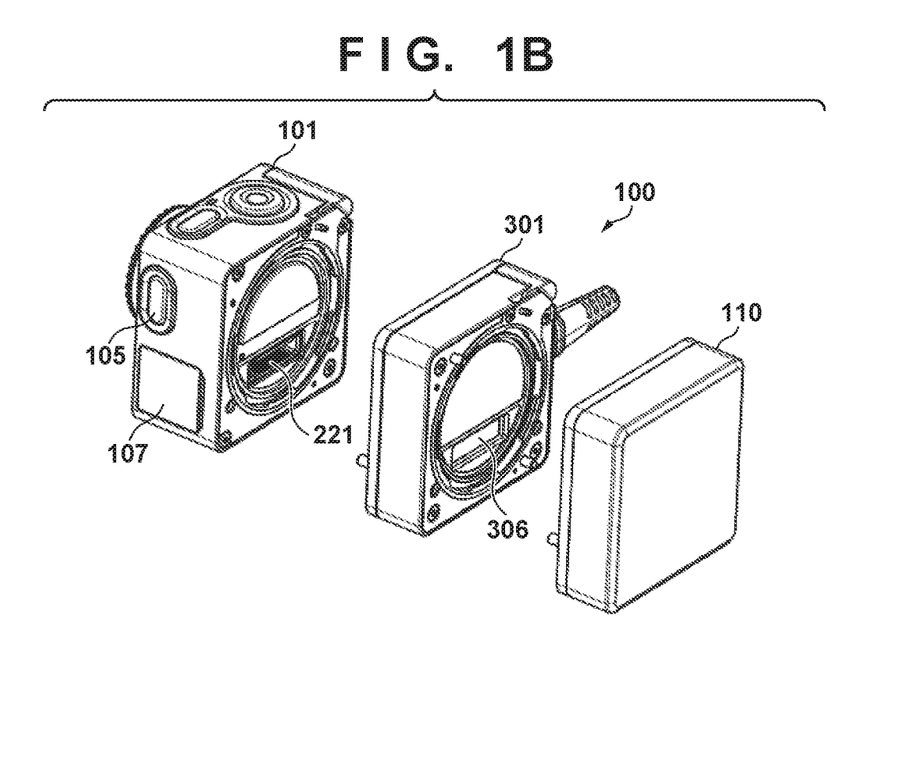
FIG. 1B is a perspective view showing the electronic device 100 formed from the modules when viewed from an obliquely rear side.

FIG. 1A is a perspective view showing an electronic device 100 formed from modules when viewed from an obliquely front side. FIG. 1B is a perspective view showing the electronic device 100 formed from the modules when viewed from an obliquely rear side.

Each of FIGS. 1A and 1B shows an example in which the electronic device 100 is formed from three modules 101, 301, and 110. Note that the number of modules forming the electronic device 100 may be two, or four or more. As shown in FIGS. 1A and 1B, the module 301 is connected between the module 101 and the module 110. Each of FIGS. 1A and 1B shows a state in which the module 101, the module 301, and the module 110 are separated from each other.

The module 101 is a module located at the first position of the electronic device 100 and is a control module that controls the operations of the other modules. Furthermore, the module 101 is also an image capture module having an image capture function. The module 110 is a terminal module that terminates the electronic device 100.

The module 301 is, for example, a module that has a specific function. A user can connect one or more modules 301 between the module 101 and the module 110. Each of FIGS. 1A and 1B shows an example in which one module 301 is connected between the module 101 and the module 110. A power supply module that includes a battery (a primary battery or a secondary battery) for supplying power to the module 101 and other modules is an example of the module 301. An input/output (I/O) module that includes an external interface (I/F) for communicating with an external device is also an example of the module 301. Each of an NFC (Near Field Communication) module that performs near field wireless communication and a communication module that transmits/receives data with the external device by wireless communication is an example of the module 301. Each of an image output module that outputs a digitized image, a loudspeaker module that outputs music or an operation sound, and a microphone module for inputting a voice is an example of the module 301. Furthermore, each of a recording module that can store a large amount of data, a display module that includes a display device (for example, a liquid crystal display device), and a cooling module that cools other modules is an example of the module 301. Note that these modules are merely examples, and there is no intention of limiting the function of the module 301.

As described above, the module 101 is the control module and the image capture module. An image capture unit 102 for capturing an optical image of an object is attached to the front surface of the module 101. A release button 104 is provided on the upper surface of the module 101. A storage medium 212 (see FIG. 2) is stored in a storage room 107. A power button 105 used to power on the module 101 is provided on the side surface portion of the module 101. The module 101 includes a jack cover portion 108 for protecting an input/output jack. It is possible to connect various cables to the input/output jack by keeping the jack cover portion 108 open.

The module 101 includes a locking portion 109 having a mechanism for locking the module 301 or 110 at a lower stage to the module 101. The locking portion 109 can be caused to pivot, and can move between a lock position and an unlock position. When the locking portion 109 moves to the lock position, the locking portion 109 is set in a lock state (a state in which the module 301 or 110 is locked to the module 101). When the locking portion 109 moves to the unlock position, the locking portion 109 is set in an unlock state (a state in which the module 301 or 110 is not locked to the module 101). If the locking portion 109 is in the unlock state, the module 301 or 110 can be detached from the module 101. The module 101 includes a connector 221 for connecting the module 301 located at the lower stage of the module 101 to the module 101.

The module 301 is the module having the specific function. The module 301 includes a connector 305 for connecting the module located at the upper stage of the module 301 to the module 301 and a connector 306 for connecting the module located at the lower stage of the module 301 to the module 301.

The module 110 is the terminal module. The module 110 includes a connector 315 for connecting the module located at the upper stage of the module 110 to the module 110. The module 110 terminates connection of the modules 101, 301, and 110 that form the electronic device 100. Therefore, the module 110 is structured so as to terminate the electronic device 100.

Constituent elements of the module 101 will be described next with reference to FIG. 2.

Figure 2:
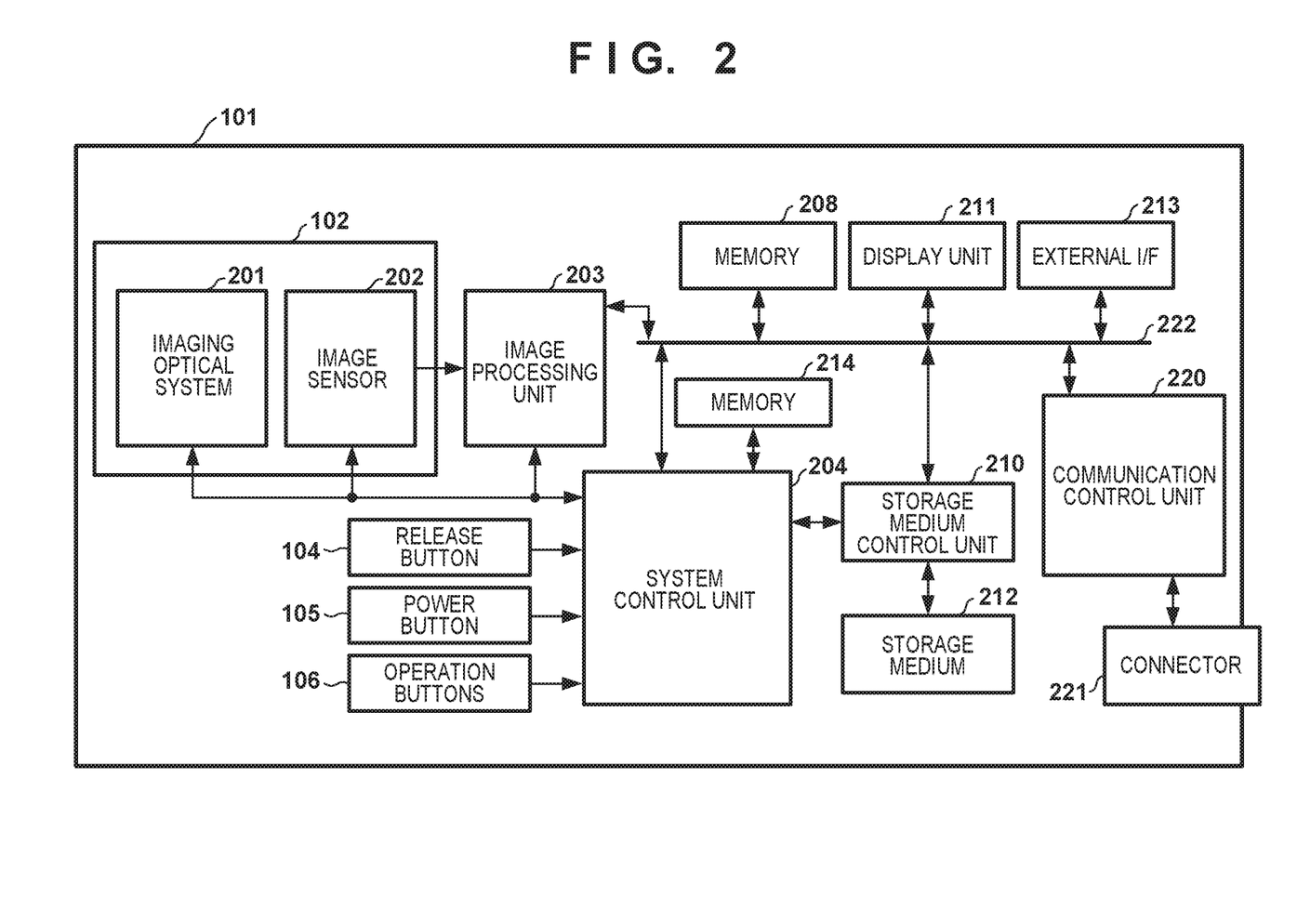
FIG. 2 is a block diagram for illustrating components of a module 101.

As shown in FIG. 2, the module 101 includes the image capture unit 102, the release button 104, the power button 105, operation buttons 106, an image processing unit 203, a system control unit 204, a memory 208, a storage medium control unit 210, and a display unit 211. The module 101 further includes an external interface 213, a memory 214, a communication control unit 220, a connector d a system bus 222. The image processing unit 203, the system control unit 204, the memory 208, the storage medium control unit 210, the display unit 211, the external interface 213, and the communication control unit 220 can communicate with each other via the system bus 222.

The image capture unit 102 includes an imaging optical system 201 and an image sensor 202. The imaging optical system 201 includes a lens unit, a shutter, a stop, or the like. The imaging optical system 201 forms an optical image of an object on an imaging surface of the image sensor 202. The stop adjusts a light amount reaching the imaging surface of the image sensor 202. The shutter controls incident time of light reaching the imaging surface of the image sensor 202. Photoelectric conversion elements arranged two-dimensionally are provided on the imaging surface of the image sensor 202. The image sensor 202 generates an analog signal by photoelectrically converting the optical image of the object by the photoelectric conversion elements. The image sensor 202 performs gain adjustment on the generated analog signal and performs A/D conversion of converting the analog signal that has undergone gain adjustment into a digital signal. In this manner, the image sensor 202 generates image signals of respective colors of R, Gr, Gb, and B and transmits the generated image signals to the image processing unit 203.

The image processing unit 203 generates image data by performing various kinds of image processing on the image signals obtained by the image sensor 202. For example, a noise reduction process, a low-pass filter process, a shading process, a white balance process, or the like can be given as the image processing performed by the image processing unit 203. The image processing unit 203 can further perform various kinds of a correction process, a compression process, or the like on the image signals.

The system control unit 204 includes a memory that stores a program for controlling each component of the module 101 and a processor (for example, a hardware processor) that controls each component of the module 101 by executing the program stored in the memory.

The memory 208 temporarily stores image data. The storage medium control unit 210 controls write and readout of the image data in/from the storage medium 212. The storage medium 212 is, for example, a semiconductor memory. The storage medium 212 may be detachable or undetachable from the module 101. The display unit 211 displays, for example, the state of the module 101. The external interface 213 is an input/output interface for performing communication with the external device. The memory 214 can be used as a work area of the system control unit 204. The memory 214 stores various kinds of setting information of the module 101.

The system control unit 204 receives a signal according to an operation performed by the user on each of the release button 104, the power button 105, and the operation buttons 106. The system control unit 204 performs control according to these signals on the respective units of the module 101. The user can perform a two-step pressing operation on the release button 104. When the release button 104 is set in a half stroke state, a photometry operation, a distance measurement operation, or the like as an image capture preparation operation is started. When the release button 104 is set in a full stroke state, an image capture operation is started, and image data obtained by the image capture operation is stored in the storage medium 212. The image data may be transmitted to at least one of the modules 301 and 110 via the connector 221. The user can perform various settings on the module 101 by operating the operation buttons 106. The user can power on or off the module 101 by operating the power button 105.

The system control unit 204 performs communication with the other modules 301 and 110 via the communication control unit 220 and the connector 221. The system control unit 204 can function as a control unit that recognizes each of the modules 301 and 110 connected to the module 101, and allocates a unique address to each of the modules 301 and 110. The system control unit 204 determines, based on predetermined information stored in a connection state storage unit 404 (see FIG. 3), whether communication is possible with a predetermined module out of the modules 301 and 110. The predetermined module is, for example, a module located at the lowermost stage out of the modules to which the unique addresses are allocated. The determination is performed, for example, when starting up the electronic device 100. If communication is possible with the predetermined module in the determination, the system control unit 204 performs communication with the modules 301 and 110 based on the predetermined information stored in the connection state storage unit 404 without updating the predetermined information. On the other hand, if communication is not possible with the predetermined module in the determination, the system control unit 204 updates the predetermined information stored in the connection state storage unit 404, and performs communication with the modules 301 and 110 based on the updated predetermined information. The system control unit 204 performs, based on a shared address, communication with a module lacking the unique address.

Figure 3:
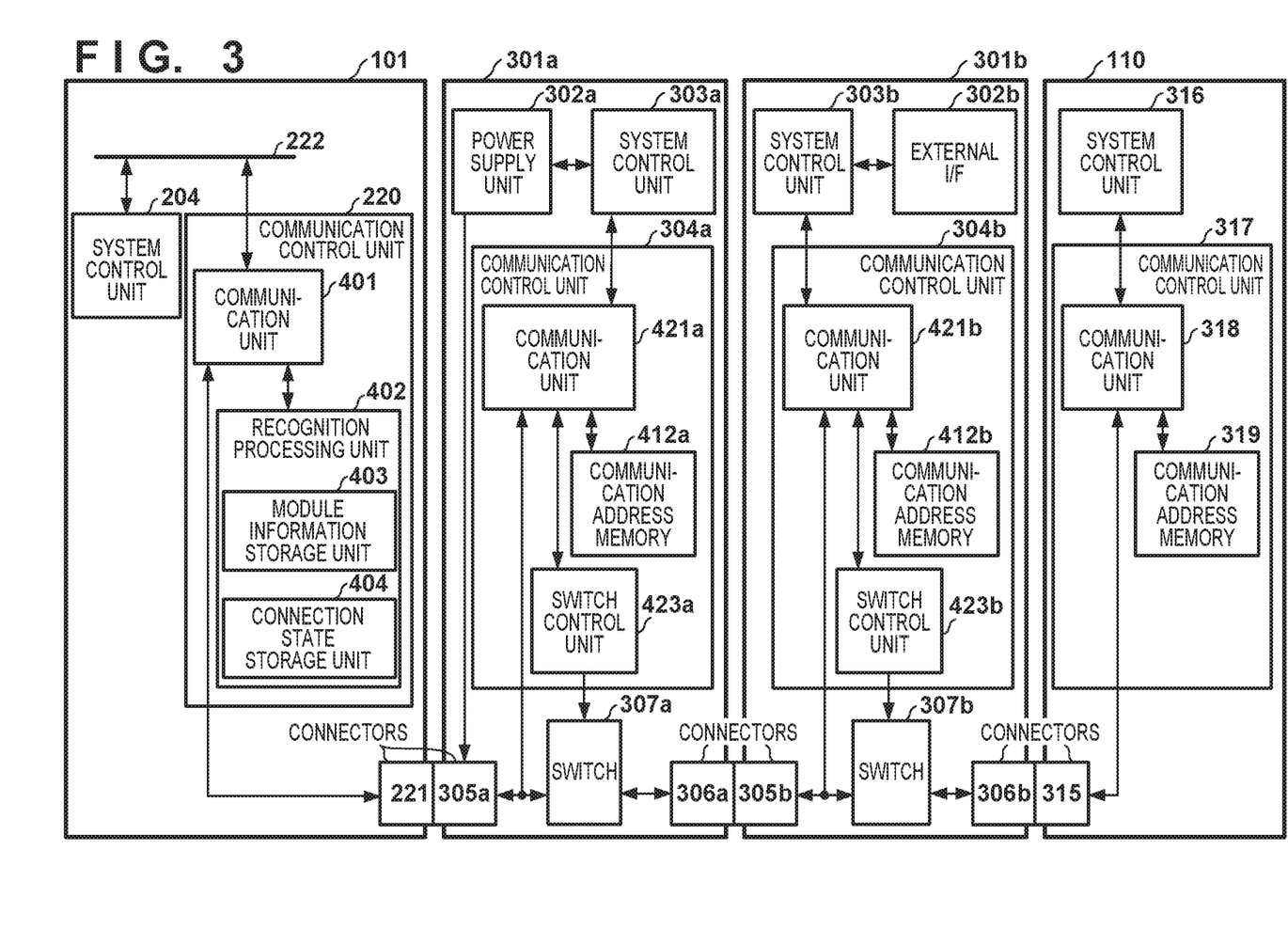
FIG. 3 is a block diagram for illustrating a state in which the module 101 and modules 301a, 301b, and 110 are coupled to each other.

An example in which the electronic device 100 is formed from four modules, namely, the module 101, modules 301a and 301b, and the module 110 will be described next. FIG. 3 is a block diagram for illustrating a state in which the modules 101, 301a, 301b, and 110 are coupled to each other.

FIG. 3 illustrates the system control unit 204, the communication control unit 220, the connector 221, and the system bus 222 out of the components of the module 101, and does not illustrate the components other than these. In FIG. 3, a case in which the module 301a is a power supply module, and the module 301b is an I/O module will be described as an example. However, the first embodiment is not limited to this. Here, to simplify the description, a state in which the two modules 301a and 301b are connected between the module 101 and the module 110 is illustrated. However, the first embodiment is not limited to this. Three or more modules 301 may be connected between the module 101 and the module 110.

The module 101 is the control module and the image capture module. The communication control unit 220 of the module 101 includes a communication unit 401 and a recognition processing unit 402. The communication unit 401 performs communication by a predetermined communication format. The recognition processing unit 402 recognizes the modules 301 and 110 connected to the module 101. The recognition processing unit 402 includes a module information storage unit 403 and the connection state storage unit 404. The module information storage unit 403 stores information on the modules 301 and 110. The connection state storage unit 404 stores information concerning the types, connection order, or the like of the modules 301 and 110 currently connected to the module 101. The module information storage unit 403 and the connection state storage unit 404 may be a part of the memory 208 or a part of the memory 214. The connection state storage unit 404 can function as a storage unit that stores predetermined information which includes the unique addresses allocated to the modules 301 and 110.

The module 301a is, for example, the above-described power supply module. The module 301a includes a system control unit 303a, a power supply unit 302a, a communication control unit 304a, connectors 305a and 306a, and a switch 307a.

The system control unit 303a includes a memory that stores a program for controlling each component of the module 301a and a processor (for example, a hardware processor) that controls each component of the module 301a by executing the program stored in the memory. The system control unit 303a performs communication with the module 101 via the communication control unit 304a and the connector 305a. The power supply unit 302a includes a battery (a primary battery or a secondary battery). The power supply unit 302a supplies power to each component of the module 301a and also supplies power to each component of the module 101, each component of the module 301b, and each component of the module 110 via the connectors 305a and 306a. The power supply unit 302a is controlled by the system control unit 303a.

The communication control unit 304a includes a communication unit 421a, a communication address memory 412a, and a switch control unit 423a. The communication unit 421a performs communication by a predetermined communication format. The communication address memory 412a stores the communication address of the module 301a. In a stage before the module 101 allocates a unique address to the module 301a, the communication address memory 412a stores a shared address (initial value) as the communication address. When the module 101 allocates the unique address to the module 301a, the communication address memory 412a stores the unique address allocated from the module 101 as the communication address of the module 301a. The unique address allocated to the module 301a is deleted from the communication address memory 412a when the module 301a is detached from the module 101. Therefore, the communication address of the module 301a returns to the shared address when the module 301a is detached from the module 101.

The connector 305a is used to make an electrical connection with the module located at the upper stage of the module 301a. A case in which the connector 305a is connected to the connector 221 of the module 101 will be described here as an example. The connector 306a is used to make an electrical connection with the module 301*b* located at the lower stage of the module 301*a*. A case in which the connector 306*a* is connected to a connector 305*b* of the module 301*b* will be described here as an example. The switch 307*a* is used to switch whether to electrically connect a communication line connected to the communication unit 421*a* of the module 301*a* to a communication unit 421*b* of the module 301*b* located at the lower stage of the module 301*a*. Note that reference numeral 421 is used when generally describing a communication unit, and reference numerals 421*a* and 421*b* are used when describing the individual communication units. The switch control unit 423*a* controls ON/OFF of the switch 307*a*.

The module 301*b* is, for example, the above-described I/O module. The module 301*b* includes a system control unit 303*b*, an external interface 302*b*, a communication control unit 304*b*, the connector 305*b*, a connector 306*b*, and a switch 307*b*.

The system control unit 303*b* includes a memory that stores a program for controlling each component of the module 301*b* and a processor (for example, a hardware processor) that controls each component of the module 301*b* by executing the program stored in the memory. The system control unit 303*b* performs communication with the system control unit 204 of the module 101 via the communication control unit 304*b* and the connector 305*b*. The external interface 302*b* is used to communicate with the external device. The external interface 302*b* is controlled by the system control unit 303*b*.

The communication control unit 304*b* includes the communication unit 421*b*, a communication address memory 412*b*, and a switch control unit 423*b*. The communication address memory 412*b* stores the communication address of the module 301*b*. In a stage before the system control unit 204 of the module 101 allocates a unique address to the module 301*b*, the communication address memory 412*b* stores a shared address (initial value) as the communication address. When the system control unit 204 of the module 101 allocates the unique address to the module 301*b*, the communication address memory 412*b* stores the unique address allocated from the system control unit 204 as the communication address of the module 301*b*. The unique address allocated to the module 301*b* is deleted from the communication address memory 412*b* when the module 301*b* is detached from the module 101. Therefore, the communication address of the module 301*b* returns to the shared address when the module 301*b* is detached from the module 301*a*.

The connector 305*b* is used to make an electrical connection with the module 301*a* located at the upper stage of the module 301*b*. A case in which the connector 305*b* is connected to the connector 306*a* of the module 301*a* will be described here as an example. The connector 306*b* is used to make an electrical connection with the module 110 located at the lower stage of the module 301*b*. The switch 307*b* is used to switch whether to electrically connect a communication line connected to the communication unit 421*b* of the module 301*b* to a communication unit 318 of the module 110 located at the lower stage of the module 301*b*. The switch control unit 423*b* controls ON/OFF of the switch 307*b*.

The module 110 is the terminal module. The module 110 includes a system control unit 316 and a communication control unit 317.

The system control unit 316 includes a memory that stores a program for controlling each component of the module 110 and a processor (for example, a hardware processor) that controls each component of the module 110 by executing the program stored in the memory. The system control unit 316 performs communication with the system control unit 204 of the module 101 via the communication control unit 317.

The communication control unit 317 includes the communication unit 318 and a communication address memory 319. The communication address memory 319 stores the communication address of the module 110. In a stage before the module 110 allocates a unique address to the module 110, the communication address memory 319 stores a shared address (initial value) as the communication address. When the system control unit 204 of the module 101 allocates the unique address to the module 110, the communication address memory 319 stores the unique address allocated from the system control unit 204 as the communication address of the module 110. The unique address allocated to the module 110 is deleted from the communication address memory 319 when the module 301*b* is detached from the module 110. Therefore, the communication address of the module 110 returns to the shared address when the module 110 is detached from the module 301*b*.

The connector 315 is used to make an electrical connection with the module 301*b* located at the upper stage of the module 110. A case in which the connector 315 is connected to the connector 306*b* of the module 301*b* will be described here as an example.

Exemplary operations of the electronic device 100 will be described next with reference to FIGS. 4A to 4I.

Figure 4A:
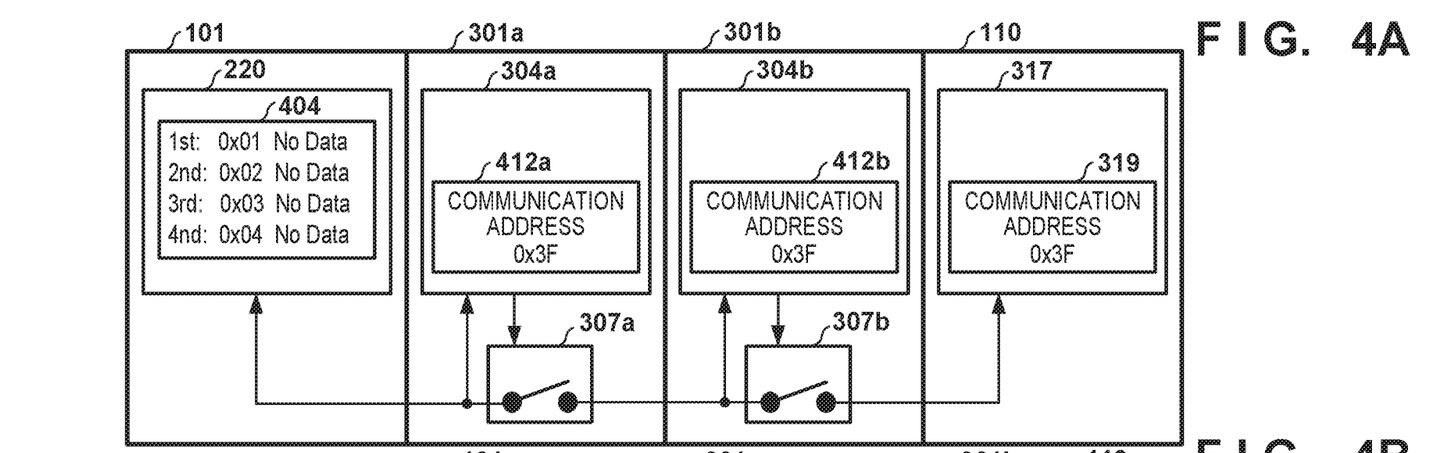
FIG. 4A is a diagram for illustrating an exemplary operation of the electronic device 100.

FIG. 4A corresponds to an initial state as a state before the system control unit 204 of the module 101 recognizes the modules 301*a*, 301*b*, and 110. Because of the initial state, the connection state storage unit 404 of the module 101 does not store (No Data) information concerning the connection state of the module connected to the module 101, as shown in FIG. 4A. Further, because of the initial state, each of the communication address memories 412*a*, 412*b*, and 319 of the modules 301*a*, 301*b*, and 110 stores, for example, 0x3F serving as a shared address as a communication address. Furthermore, because of the initial state, the respective switches 307*a* and 307*b* of the modules 301*a* and 301*b* are set in an OFF state, as shown in FIG. 4A.

The system control unit 204 of the module 101 first tries communication with a module located at the uppermost stage out of the modules 301 and 110 connected to the module 101. Because the connection state storage unit 404 does not store information concerning the connection state of the module at the uppermost stage, the system control unit 204 of the module 101 tries communication with the module at the uppermost stage by using the shared address. In all the modules 301*a*, 301*b*, and 110, the communication address stored in each of the communication address memories 412*a*, 412*b*, and 319 is the shared address. However, because the switch 307*a* is set in the OFF state, the system control unit 204 of the module 101 receives a response only from the module 301*a*. Then, communication is established between the module 101 and the module 301*a*.

When communication is established between the module 101 and the module 301*a*, the system control unit 204 of the module 101 inquires of the module 301*a* information concerning the module 301*a*. The module 301*a* transmits the information concerning the module 301*a* to the system control unit 204 of the module 101. The system control unit 204 of the module 101 allocates a unique address of, for example, 0x01 to the module 301*a* and transmits the allocated unique address to the module 301*a*.

Figure 4B:
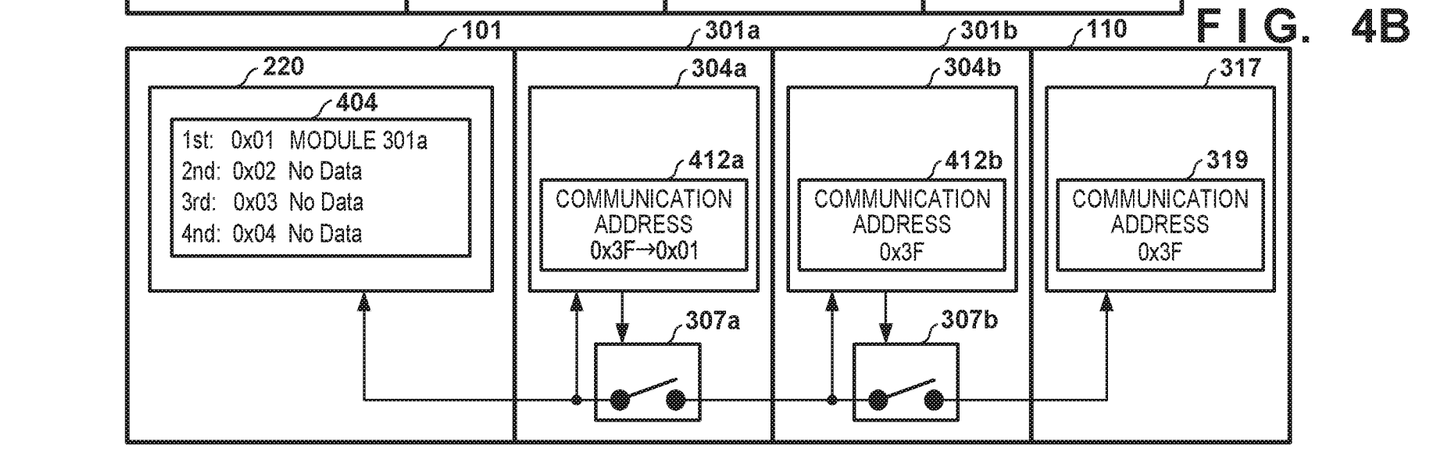
FIG. 4B is a diagram for illustrating an exemplary operation of the electronic device 100.

The system control unit 303*a* of the module 301*a* stores the unique address allocated from the system control unit 204 of the module 101 in the communication address memory 412a, as shown in FIG. 4B. The system control unit 204 of the module 101 stores, in the connection state storage unit 404, the unique address allocated to the module 301a in association with the information concerning the module 301a to which the unique address is allocated. After allocating the unique address to the module 301a, the system control unit 204 of the module 101 can perform communication with the module 301a by using the unique address.

Figure 4C:
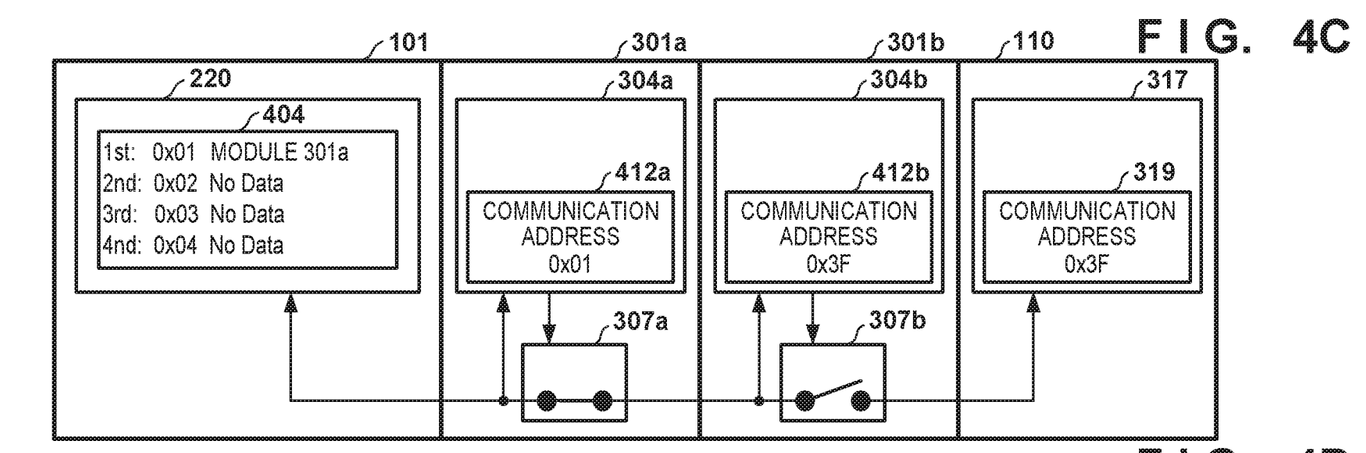
FIG. 4C is a diagram for illustrating an exemplary operation of the electronic device 100.

When the unique address is allocated, the system control unit 303a of the module 301a sets the switch 307a in an ON state as shown in FIG. 4C. When the switch 307a is set in the ON state, the system control unit 204 of the module 101 can perform communication not only with the module 301a but also with the module 301b located at the lower stage of the module 301a.

The module 301a located at the uppermost stage out of the modules 301 and 110 connected to the module 101 is thus recognized. However, because the module 301a is not a terminal module, the system control unit 204 of the module 101 tries to recognize the module located at the second stage out of the modules 301 and 110 connected to the module 101. Because the connection state storage unit 404 does not store information concerning the connection state of the module at the second stage, the system control unit 204 of the module 101 tries communication with the module at the second stage by using the shared address. In both the modules 301b and 110, the communication address stored in each of the communication address memories 412b and 319 is the shared address. However, because the switch 307b is set in the OFF state, the system control unit 204 of the module 101 receives a response only from the module 301b. Then, communication is established between the module 101 and the module 301b.

When communication is established between the module 101 and the module 301b, the system control unit 204 of the module 101 inquires of the module 301b information concerning the module 301b. The module 301b transmits the information concerning the module 301b to the system control unit 204 of the module 101. The system control unit 204 of the module 101 allocates a unique address of, for example, 0x02 to the module 301b and transmits the allocated unique address to the module 301b.

Figure 4D:
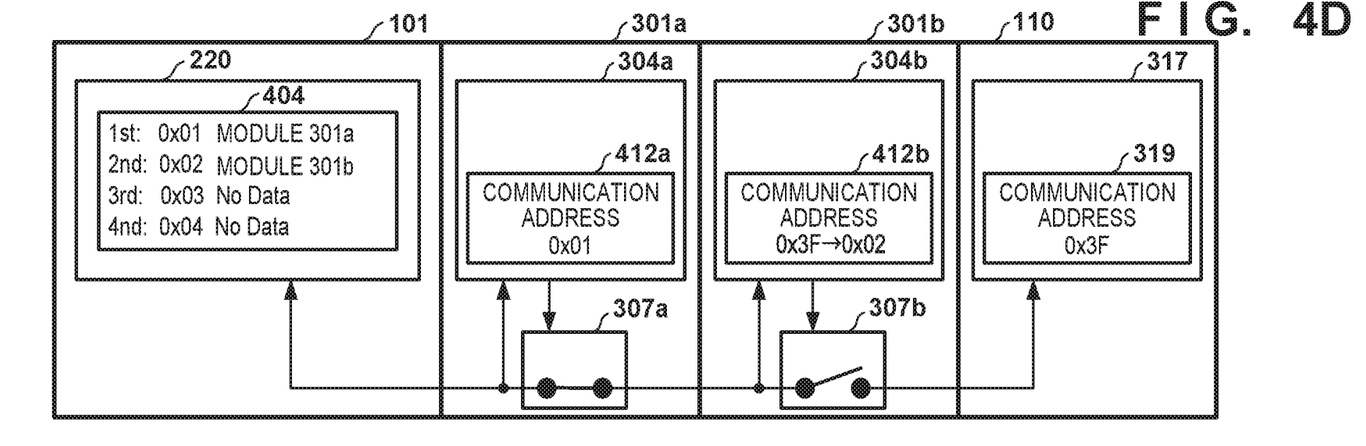
FIG. 4D is a diagram for illustrating an exemplary operation of the electronic device 100.

The system control unit 303b of the module 301b stores the unique address allocated from the system control unit 204 of the module 101 in the communication address memory 412b, as shown in FIG. 4D. The system control unit 204 of the module 101 stores, in the connection state storage unit 404, the unique address allocated to the module 301b in association with the information concerning the module 301b to which the unique address is allocated. After allocating the unique address to the module 301b, the system control unit 204 of the module 101 can perform communication with the module 301b by using the unique address.

Figure 4E:
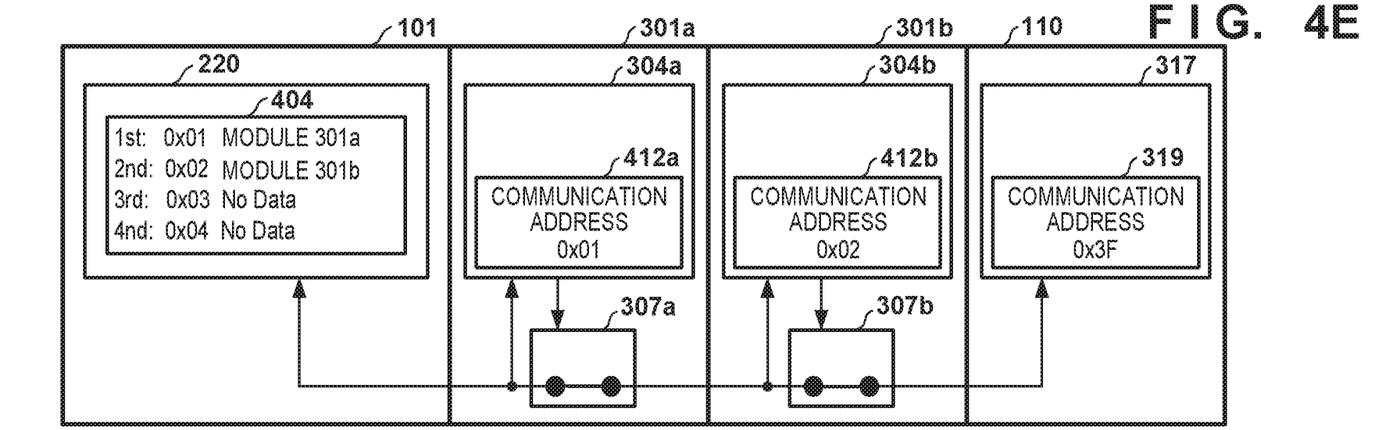
FIG. 4E is a diagram for illustrating an exemplary operation of the electronic device 100.

When the uniqueaddress is allocated, the system control unit 303b of the module 301b sets the switch 307b in the ON state as shown in FIG. 4E. When the switch 307b is set in the ON state, the system control unit 204 of the module 101 can perform communication not only with the modules 301a and 301b but also with the module 110 located at the lower stage of the module 301b.

The module 301b located at the second stage out of the modules 301 and 110 connected to the module 101 is thus recognized. However, because the module 301b is not a terminal module, the system control unit 204 of the module 101 tries to recognize the module located at the third stage out of the modules 301 and 110 connected to the module 101. Because the connection state storage unit 404 does not store information concerning the connection state of the module at the third stage, the system control unit 204 of the module 101 tries communication with the module at the third stage by using the shared address. In the module 110, the communication address stored in the communication address memory 319 is the shared address. Therefore, the system control unit 204 of the module 101 receives a response only from the module 110. Then, communication is established between the module 101 and the module 110.

When communication is established between the module 101 and the module 110, the system control unit 204 of the module 101 inquires of the module 110 information concerning the module 110. The module 110 transmits the information concerning the module 110 to the system control unit 204 of the module 101. The system control unit 204 of the module 101 allocates a unique address of, for example, 0x03 to the module 110 and transmits the allocated unique address to the module 110.

Figure 4F:
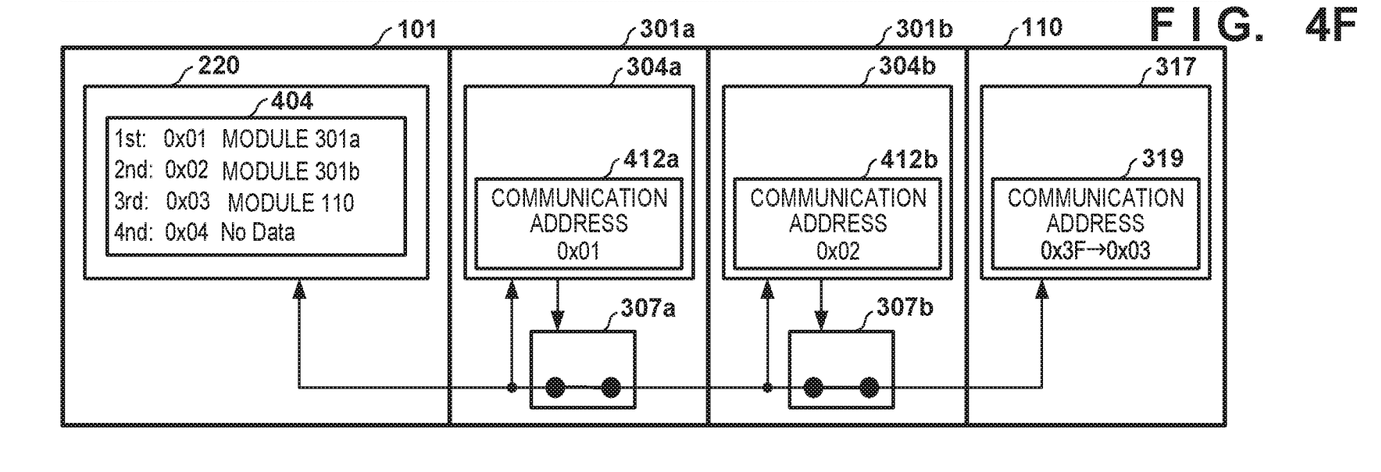
FIG. 4F is a diagram for illustrating an exemplary operation of the electronic device 100.

The system control unit 316 of the module 110 stores the unique address allocated from the system control unit 204 of the module 101 in the communication address memory 319, as shown in FIG. 4F. The system control unit 204 of the module 101 stores, in the connection state storage unit 404, the unique address allocated to the module 110 in association with the information concerning the module 110 to which the unique address is allocated. After allocating the unique address to the module 110, the system control unit 204 of the module 101 can perform communication with the module 110 by using the unique address.

The module 110 located at the third stage out of the modules 301 and 110 connected to the module 101 is thus recognized. Because the module 110 is the terminal module, the system control unit 204 of the module 101 ends a recognition process of the modules 301 and 110 connected to the module 101.

Figure 4G:
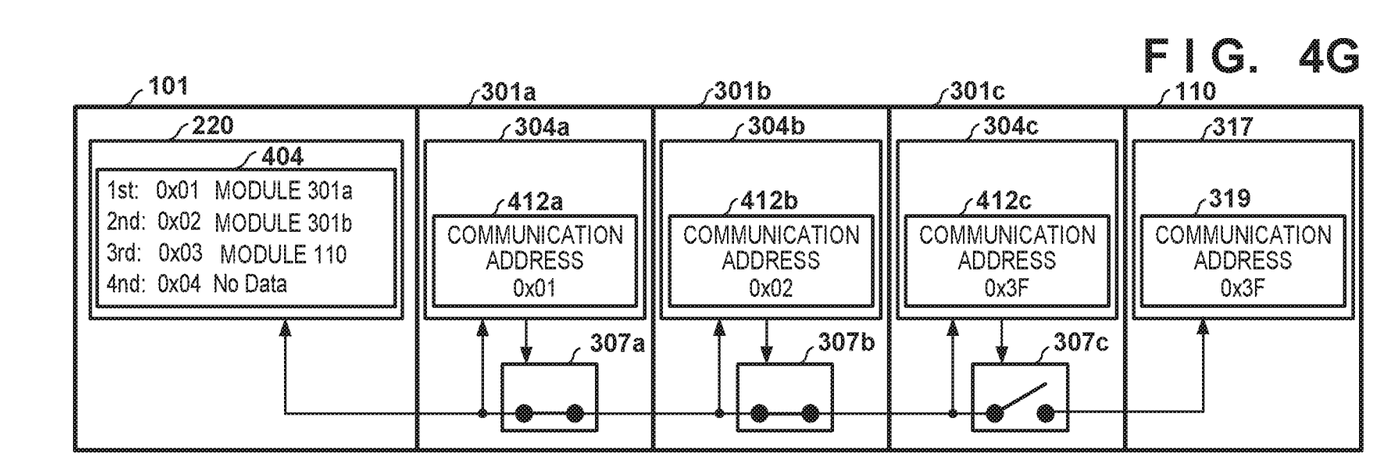
FIG. 4G is a diagram for illustrating an exemplary operation of the electronic device 100.

When the recognition process is completed, the user can use the electronic device 100. Subsequently, the user may change the module arrangement of the electronic device 100. For example, if the user detaches the module 301b from the module 110, and connects a module 301c between the module 301b and the module 110, a state as shown in FIG. 4G is obtained. If the module arrangement is changed, the system control unit 204 of the module 101 performs a process for restarting up the electronic device 100. At the time of re-startup, the system control unit 204 of the module 101 tries communication with the module 110 located at the lowermost stage out of the modules 301 and 110 connected to the module 101. If the module arrangement is changed without detaching the module 101 from the module 301a serving as the power supply module, information before the module arrangement is changed remains in the connection state storage unit 404 as shown in FIG. 4G. Based on information stored in the connection state storage unit 404, the system control unit 204 of the module 101 tries communication with the module located at the lowermost stage. For example, as shown in FIG. 4G, the connection state storage unit 404 stores three modules. A unique address allocated to the module 110 at the lowermost stage out of these three modules is, for example, 0x03. The system control unit 204 of the module 101 tries communication with a module by using an address of, for example, 0x03.

Because power is not supplied to the added module 301c, a communication address memory 412c of the module 301c is in a state in which the shared address is set as a communication address. That is, the module 301c lacks a unique address. When the module arrangement is changed, power supply to the module 110 is cut off, setting a state in which the shared address is set as a communication address in the communication address memory 319 of the module 110. That is, the module 110 also lacks a unique address. Therefore, as shown in FIG. 4G, a switch 307c of the module 301c is set in the OFF state. Each of the communication address memories 412c and 319 of the modules 301c and 110 stores, for example, 0x3F serving as the shared address as the communication address. Because the module having the set communication address of 0x03 is not in connection with the module 101 via a communication line, the system control unit 204 of the module 101 cannot establish communication by using the address of 0x03. In this case, the system control unit 204 of the module 101 determines that the module arrangement is changed and recognizes the module anew as follows. The system control unit 204 performs the recognition process sequentially from the module located at the uppermost stage out of the modules 301 and 110 connected to the module 101.

First, the system control unit 204 of the module 101 tries to recognize the module located at the uppermost stage out of the modules 301 and 110 connected to the module 101. The communication address of the module stored in the connection state storage unit 404 as the module at the uppermost stage is 0x01. On the other hand, the communication address stored in the communication address memory 412a of the module 301a is 0x01. Because the communication addresses match, the system control unit 204 receives a response from the module 301a. Then, communication is established between the module 101 and the module 301a. When the communication is established, the system control unit 204 of the module 101 inquires of the module 301a the information concerning the module 301a. Subsequently, the information concerning the module 301a is transmitted from the module 301a to the system control unit 204. Information on the module stored in the connection state storage unit 404 as the module at the uppermost stage and the information received from the module 301a match. The system control unit 204 can recognize the module 301a normally, and thus completes the renewed recognition of the module 301a.

The module 301a located at the uppermost stage out of the modules 301 and 110 connected to the module 101 is thus recognized. However, because the module 301a is not the terminal module, the system control unit 204 of the module 101 tries to recognize the module located at the second stage out of the modules 301 and 110 connected to the module 101. The communication address of the module stored in the connection state storage unit 404 as the module at the second stage is 0x02. On the other hand, the communication address stored in the communication address memory 412b of the module 301b is 0x02. Because the communication addresses match, the system control unit 204 receives a response from the module 301b. Then, communication is established between the module 101 and the module 301b. When the communication is established, the system control unit 204 of the module 101 inquires of the module 301b the information concerning the module 301b. Subsequently, the information concerning the module 301b is transmitted from the module 301b to the system control unit 204. Information on the module stored in the connection state storage unit 404 as the module at the second stage and the information received from the module 301b match. The system control unit 204 can recognize the module 301b normally, and thus completes the renewed recognition of the module 301b.

The module 301b located at the second stage out of the modules 301 and 110 connected to the module 101 is thus recognized. However, because the module 301b is not the terminal module, the system control unit 204 of the module 101 tries to recognize the module located at the third stage out of the modules 301 and 110 connected to the module 101. The communication address of the module stored in the connection state storage unit 404 as the module at the third stage is 0x03. On the other hand, the communication address stored in the communication address memory 412c of the module 301c is 0x3F serving as the shared address. Because the communication addresses do not match, the system control unit 204 does not receive a response from the module 301c. Consequently, the system control unit 204 of the module 101 tries communication with the module located at the third stage out of the modules 301 and 110 connected to the module 101 by using the shared address. In the module 301c, the communication address stored in the communication address memory 412c is the shared address. Therefore, the system control unit 204 of the module 101 receives the response from the module 301c. Note that the communication address stored in the communication address memory 319 of the module 110 is also the shared address. However, the switch 307c is in the OFF state, and thus the system control unit 204 of the module 101 does not receive a response from the module 110. Therefore, communication is established between the module 101 and the module 301c.

When the communication is established between the module 101 and the module 301c, the system control unit 204 of the module 101 inquires of the module 301c the information concerning the module 301c. The module 301c transmits the information concerning the module 301c to the system control unit 204 of the module 101. The system control unit 204 of the module 101 allocates the unique address of, for example, 0x03 to the module 301c and transmits the allocated unique address to the module 301c.

Figure 4H:
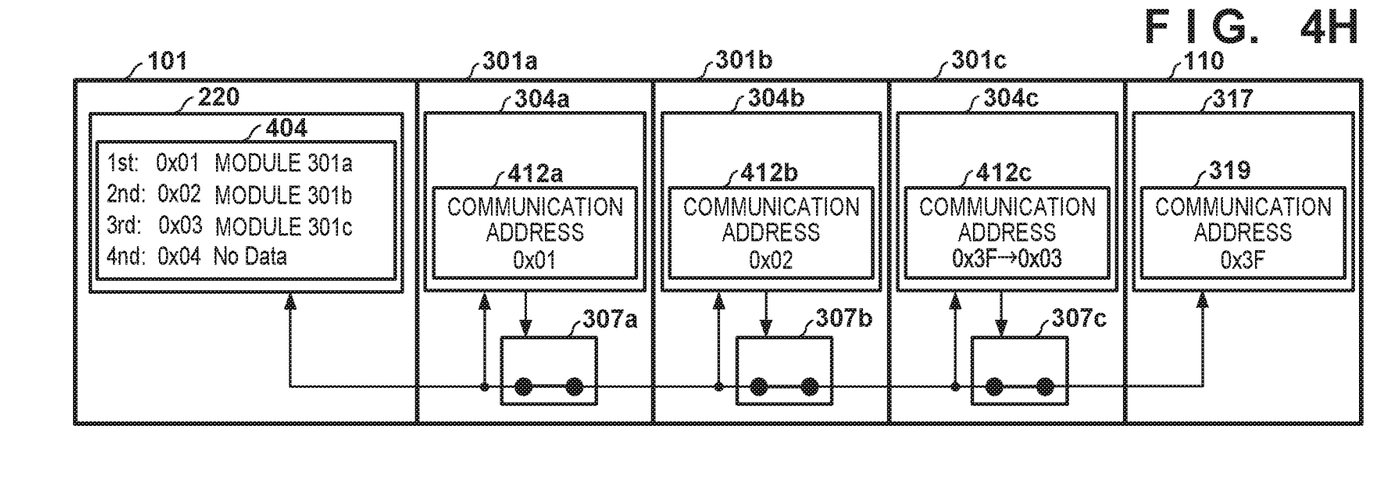
FIG. 4H is a diagram for illustrating an exemplary operation of the electronic device 100.

A system control unit (not shown) of the module 301c stores the unique address allocated from the system control unit 204 of the module 101 in the communication address memory 412c, as shown in FIG. 4H. The system control unit 204 of the module 101 stores, in the connection state storage unit 404, the unique address allocated to the module 301c in association with the information concerning the module 301c to which the unique address is allocated. After allocating the unique address to the module 301c, the system control unit 204 of the module 101 can perform communication with the module 301c by using the unique address. When the unique address is allocated, the system control unit of the module 301c sets the switch 307c in the ON state as shown in FIG. 4H. When the switch 307c is set in the ON state, the system control unit 204 of the module 101 can perform communication not only with the modules 301a to 301c but also with the module 110 located at the lower stage of the module 301c.

The module 301c located at the third stage out of the modules 301 and 110 connected to the module 101 is thus recognized. However, because the module 301c is not a terminal module, the recognition of the module located at the fourth stage out of the modules 301 and 110 connected to the module 101 is tried. Because the connection state storage unit 404 does not store information concerning the connection state of the module at the fourth stage, the system control unit 204 of the module 101 tries communication with the module at the fourth stage by using the shared address. In the module 110, the communication address stored in the communication address memory 319 is the shared address. Therefore, the system control unit 204 of the module 101 receives a response only from the module 110. Then, communication is established between the module 101 and the module 110.

When communication is established between the module 101 and the module 110, the system control unit 204 of the module 101 inquires of the module 110 information concerning the module 110. The module 110 transmits the information concerning the module 110 to the system control unit 204 of the module 101. The system control unit 204 of the module 101 allocates a unique address of, for example, 0x04 to the module 110 and transmits the allocated unique address to the module 110.

Figure 4I:
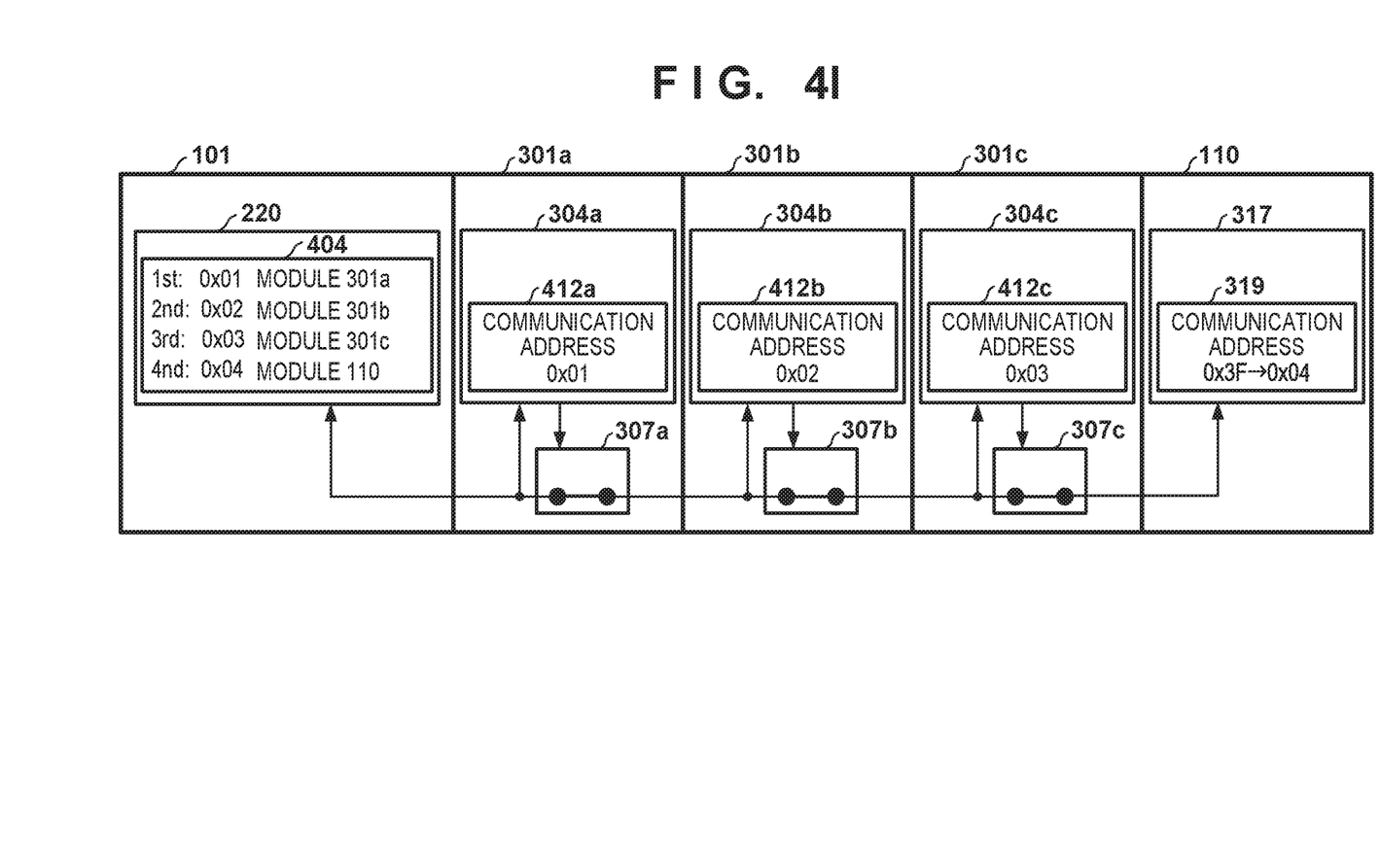
FIG. 4I is a diagram for illustrating an exemplary operation of the electronic device 100.

The system control unit 316 of the module 110 stores the unique address allocated from the system control unit 204 of the module 101 in the communication address memory 319, as shown in FIG. 4I. The system control unit 204 of the module 101 stores, in the connection state storage unit 404, the unique address allocated to the module 110 in association with the information concerning the module 110 to which the unique address is allocated. After allocating the unique address to the module 110, the system control unit 204 of the module 101 can perform communication with the module 110 by using the unique address.

The module 110 located at the fourth stage out of the modules 301 and 110 connected to the module 101 is thus recognized. Because the module 110 is the terminal module, the system control unit 204 of the module 101 ends a renewed recognition process of the modules 301 and 110 connected to the module 101.

Thus, according to the first embodiment, at the time of startup, based on predetermined information stored in the connection state storage unit 404, it is determined whether communication is possible with the module 110 at the lowermost stage out of the modules 301 and 110, if the communication is possible with the module 110 at the lowermost stage in the determination, communication is performed with the modules 301 and 110 based on the predetermined information stored in the connection state storage unit 404 without updating the predetermined information. On the other hand, if the communication is not possible with the module 110 at the lowermost stage in the determination, the predetermined information stored in the connection state storage unit 404 is updated, and communication is performed with the modules 301 and 110 based on the updated predetermined information. Hence, according to the first embodiment, it is possible to shorten a startup time while preventing occurrence of an error.

Note that in the first embodiment, a case in which recognition process is ended based on the recognition of the module 110 serving as the terminal module has been described as an example. Flowever, the first embodiment is not limited to this. The recognition process may be ended if it is impossible to perform the recognition process on a module located at the lower stage of a recognized module.

Second Embodiment

In the second embodiment, a modification of the first embodiment will be described.

In the first embodiment, the example has been described in which if it is determined that the module arrangement is changed, the recognition process is performed sequentially from the module located at the uppermost stage out of the modules 301 and 110 connected to the module 101. However, the first embodiment can be changed as in the second embodiment. For example, as will be described in the second embodiment, based on information stored in a connection state storage unit 404, the recognition process may be performed in an order from a lower stage side to an upper stage side. Then, a module capable of communication based on the information stored in the connection state storage unit 404 may be detected, and the recognition process may be redone for a module located at the lower stage than the detected module. The detected module and a module located on the upper stage side titan the detected module are modules that are not detached when a module arrangement is changed. Therefore, it is possible to perform communication based on the information stored in the connection state storage unit 404 without redoing the recognition process from a module at the uppermost stage to the detected module. Renewed recognition from the module at the uppermost stage to the detected module is not needed, making it possible to shorten a time required for re-startup.

For example, if it is determined that the module arrangement is changed in a state as shown in FIG. 4G, a system control unit 204 of a module 101 performs the recognition process in the order from the lower stage side to the upper stage side based on the information stored in the connection state storage unit 404. A module at the lowermost stage out of modules stored in the connection state storage unit 404 is a module located at the third stage. As can be seen in FIG. 4G, a unique address of 0x03 is allocated to the module located at the third stage, and the allocated unique address is stored in the connection state storage unit 404. However, the unique address of 0x03 is not stored in communication address memories 412a, 412b, 412c, and 319 of modules 301 and 110, and thus communication is not established.

Next, the system control unit 204 of the module 101 tries to establish communication with respect to a module at the second stage out of the modules stored in the connection state storage unit 404. For example, 0x02 is allocated as a unique address to the module at the second stage, and the allocated unique address is stored in the connection state storage unit 404. The unique address of 0x02 is stored in the communication address memory 412b of a module 301b, allowing the system control unit 204 of the module 101 to establish communication with the module 301b at the second stage. In this case, the recognition process need not be redone for a module 301a at the first stage, and it is possible to perform communication based on the information stored in the connection state storage unit 404. The system control unit 204 of the module 101 redoes the recognition process for a module 301c and the module 110 located at the lower stage than the module 301b at the second stage. Note that the recognition process for the modules 301c and 110 located at the lower stage than the module 301b at the second stage is redone in the same manner as in the first embodiment, and thus a description thereof will be omitted.

Third Embodiment

Various functions, processes, or methods described in the first and second embodiments can also be implemented by a personal computer, a microcomputer, a CPU (Central Processing Unit), a processor, or the like by using a program, in the third embodiment, a personal computer, a microcomputer, a CPU (Central Processing Unit), a processor, or the like will be called a "computer X". Also, in the third embodiment, a program for controlling the computer X and implementing the various functions, processes, or methods described in the first and second embodiments will be called a "program Y".

The various functions, processes, or methods described in the first and second embodiments are implemented by the computer X executing the program Y In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2017-140671, filed on Jul. 20, 2017, which is hereby incorporated by reference herein in its entirety.

What is claimed is:

1. A control module comprising:
   a control circuitry that recognizes modules by using a shared address and allocates unique addresses to the recognized modules; and
   a memory that stores predetermined information which includes the unique addresses allocated to the recognized modules,
   wherein the control circuitry (a) performs communication with the recognized modules based on the predetermined information stored in the memory without updating the predetermined information stored in the memory if communication with a predetermined module is available in a case where an electronic device including the control module and the recognized modules is restarted up, and (b) uses the shared address to update the predetermined information stored in the memory if communication with the predetermined module is not available in the case where the electronic device including the control module and the recognized modules is restarted up, and
   wherein the predetermined module is a module located at a lowermost stage of the recognized modules of which unique addresses are included in the predetermined information.

2. The control module according to claim 1, wherein the control circuitry determines whether or not communication with the predetermined module is available in the case where the electronic device including the control module and the recognized modules is restarted up.

3. The control module according to claim 1, wherein the control circuitry performs communication based on the shared address with a module being incapable of communication based on the unique address.

4. The control module according to claim 3, wherein each of the modules cannot perform communication based on the unique address once a connection with the control module is canceled.

5. The control module according to claim 3, wherein in a state in which a first module and a second module that is located at a lower stage of the first module are electrically separated from each other by a switch provided in a communication line, the control circuitry performs communication based on the shared address with the first module.

6. The control module according to claim 1, wherein in a case where the predetermined information stored in the memory is updated, the control circuitry recognizes modules from a module located at an uppermost stage of the modules and allocates unique addresses to the modules.

7. The control module according to claim 1, wherein in a case where the predetermined information stored in the memory is updated, the control circuitry recognizes modules and allocates unique addresses to the modules in an order from a lower stage to an upper stage.

8. The control module according to claim 1, further comprising an image capture unit.

9. An electronic device comprising:
   modules; and
   a control module including a control circuitry that recognizes the modules by using a shared address and allocates unique addresses to the recognized modules, and a memory that stores predetermined information which includes the unique addresses allocated to the recognized modules,
   wherein the control circuitry (a) performs communication with the recognized modules based on the predetermined information stored in the memory without updating the predetermined information stored in the memory if communication with a predetermined module is available in a case where the electronic device including the control module and the recognized modules is restarted up, and (b) uses the shared address to update the predetermined information stored in the memory if communication with the predetermined module is not available in the case where the electronic device including the control module and the recognized modules is restarted up, and
   wherein the predetermined module is a module located at a lowermost stage of the recognized modules of which unique addresses are included in the predetermined information.

10. A method comprising:
    recognizing modules by using a shared address;
    allocating unique addresses to the recognized modules;
    storing, in a memory, predetermined information which includes the unique addresses allocated to the recognized modules;
    performing communication with the recognized modules based on the predetermined information stored in the memory without updating the predetermined information stored in the memory if communication with a predetermined module is available in a case where an electronic device including the control module and the recognized modules is restarted up; and
    using the shared address to update the predetermined information stored in the memory if communication with the predetermined module is not available in the case where the electronic device including the control module and the recognized modules is restarted up,
    wherein the predetermined module is a module located at a lowermost stage of the recognized modules of which unique addresses are included in the predetermined information.

11. A non-transitory storage medium that stores a program causing a computer to execute a method, the method comprising:
    recognizing modules by using a shared address;
    allocating unique addresses to the recognized modules;
    storing, in a memory, predetermined information which includes the unique addresses allocated to the recognized modules;
    performing communication with the recognized modules based on the predetermined information stored in the memory without updating the predetermined information stored in the memory if communication with the predetermined module is available in a case where an electronic device including the control module and the recognized modules is restarted up; and using the shared address to update the predetermined information stored in the memory if communication with the predetermined module is not available in the case where the electronic device including the control module and the recognized modules is restarted up, wherein the predetermined module is a module located at a lowermost stage of the recognized modules of which unique addresses are included in the predetermined information.

12. The method according to claim 10, further comprising:

determining whether or not communication with the predetermined module is available in the case where the electronic device including the control module and the recognized modules is restarted up.

13. The method according to claim 10, further comprising:

performing communication based on the shared address with a module being incapable of communication based on the unique address.

14. The method according to claim 13, wherein each of the modules cannot perform communication based on the unique address once a connection with the control module is canceled.

15. The method according to claim 13, wherein communication based on the shared address with the first module is performed, in a state in which a first module and a second module that is located at a lower stage of the first module are electrically separated from each other by a switch provided in a communication line.

16. The method according to claim 10, further comprising:

recognizing modules from a module located at an uppermost stage of the modules and allocating unique addresses to the modules, in a case where the predetermined information stored in the memory is updated.

17. The method according to claim 10, further comprising:

recognizing modules and allocating unique addresses to the modules in an order from a lower stage to an upper stage, in a case where the predetermined information stored in the memory is updated.

* * * * *